July 1, 1947.  E. H. COLESWORTHY  2,423,294
FLEXIBLE WATERPROOF MATERIAL AND ITS PRODUCTION
Filed Nov. 12, 1941
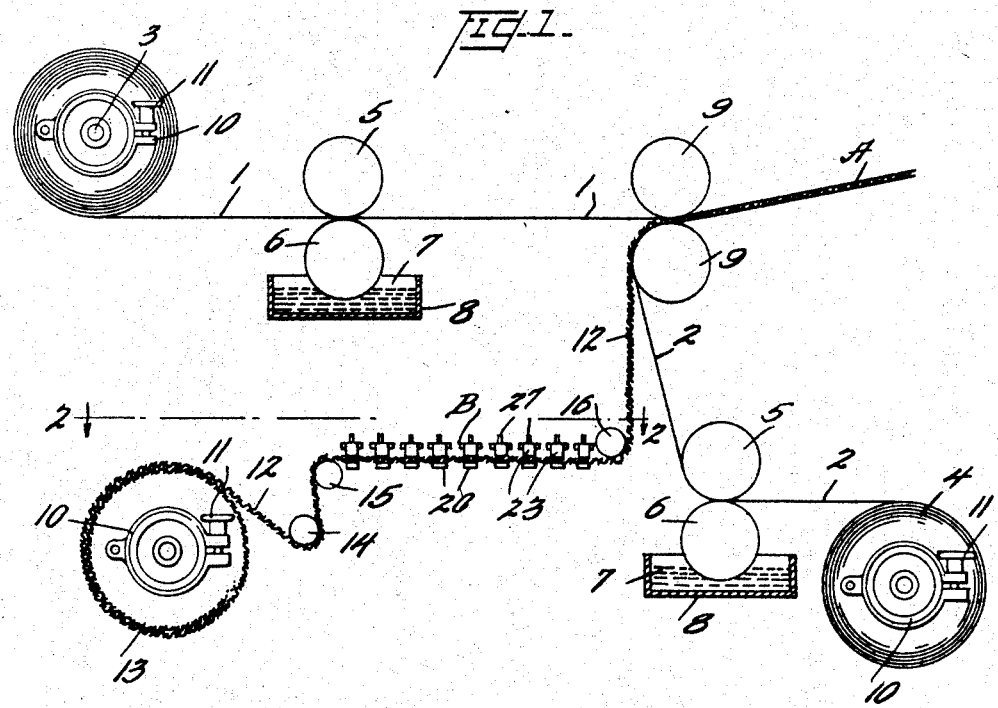
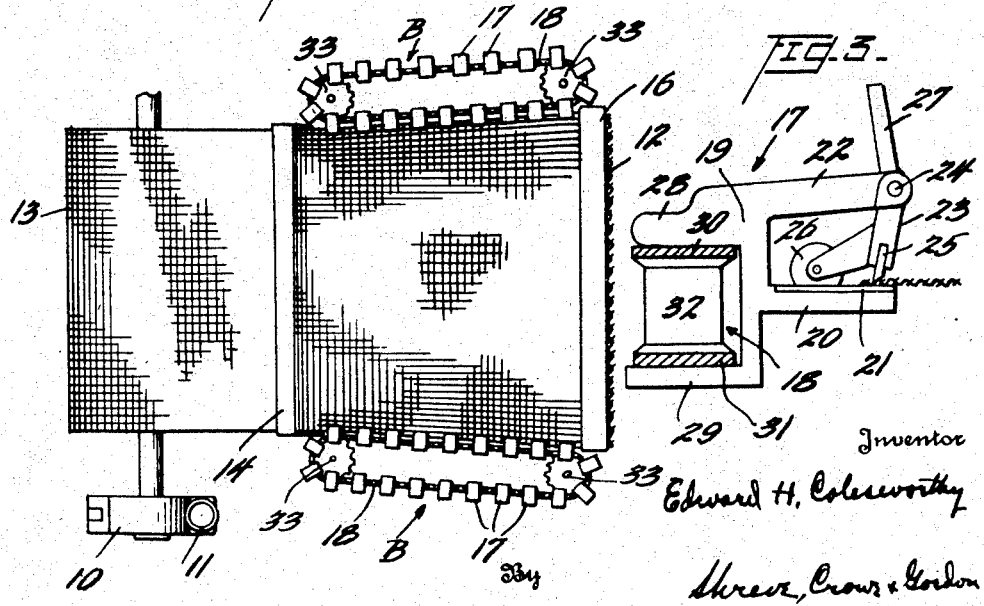
Inventor
Edward H. Colesworthy
By Shreve, Crowe & Gordon
Attorneys Patented July 1, 1947

2,423,294

UNITED STATES PATENT OFFICE 2,423,294

FLEXIBLE WATERPROOF MATERIAL AND ITS PRODUCTION

Edward H. Colesworthy, Atlanta, Ga.

Application November 12, 1941, Serial No. 418,826

2 Claims. (Cl. 154—50)

Generically this invention relates to a material for bags and the like but it more particularly is directed to a laminated waterproof pliable type of such material and the method and apparatus for making same.

One of the principal objects of this invention is a method and apparatus for providing a laminated material for making bags and the like consisting of outer layers of crinkled paper having an intermediate loosely woven membrane stretched longitudinally and laterally and adhesively retained in such stretched position.

An important object of this invention is the provision of a pliable waterproof laminated material for making bags and the like consisting of two sheets of water-resistant crinkled paper and an adhesively retained longitudinally and laterally stretched intermediate loosely woven membrane fusingly combined with said sheets.

Another important object of this invention is the provision of a method for providing a flexible waterproof laminated material for making bags and the like consisting in simultaneously coating the meeting surfaces of two sheets of crinkled paper with an adhesive, longitudinally and laterally stretching a loosely woven membrane and inserting it in such condition between said sheets and compressingly uniting the membrane and sheets into a single unitary material.

Another important object of this invention is the method for producing a flexible waterproof laminated material for making bags and the like consisting in coating the meeting surfaces of two moving webs of crinkled paper and at the same time longitudinally and laterally stretching a loosely woven membrane and inserting it intermediate said sheets and compressingly and fusingly uniting the sheets and membrane into a single unitary sheet.

A further object of this invention is the provision of an apparatus for producing a flexible waterproof laminated material for making bags and the like comprising means for coating the meeting surfaces of two moving webs of crinkled paper with an adhesive substance, adjustable means for exerting a continuous longitudinal tension on said webs, means for effecting the continuous insertion of a loosely woven membrane or web between said meeting surfaces, means for effecting a continuous longitudinal tension on said woven web, and tenter means for effecting a continuous lateral tension and stretching action on said woven web, and means for compressingly uniting said webs or layers into a unitary sheet of material, the woven portion being adhesively retained in its laterally and longitudinally stretched condition, and the resultant laminated sheet constituting an unusually strong flexible material.

Briefly stated, fabrics of this general character have either been too heavy and unpliable or requiring the use of heavy paper or heavy fabric, and for this and other reasons have proven unsatisfactory, and, therefore, the present material was developed to fill the need for a comparatively inexpensive loosely woven membrane, filling the gap between multiwall paper bags and what is known as waterproof paper lined bags, which comprise a heavy fabric either cotton or burlap combined with heavy paper. The instant material falls between these two fields and is constructed by combining two sheets of water-resistant crinkled paper with a membrane of loosely woven cotton between the two sheets, the combining agent being a suitable asphalt or other adhesive. The fabric made in this manner is extremely pliable, lends itself readily for sewing, to be made into bags or closed by sewing or tying when already made into a bag. The loosely woven cotton membrane permits the sewing to hold the entire fabric together, and which is not possible where unwoven fibers are simply laid in along with adhesive between two sheets of paper for reinforcing purposes. Due to the fact that the cotton membrane is loosely woven and the paper combined on each side of it is crinkled and treated to resist water and abrasion, the ultimate strength of the composite sheet or bag is greater than the added strength of the three component layers.

My invention will be well understood by reference to the following description of an illustrated embodiment thereof taken in connection with the accompanying drawings, wherein:

Fig. 1 is a diagrammatic view of a process for producing a material such as referred to.

Fig. 2 is a partial plan view of Fig. 1 showing the tenter chains in operative material stretching engagement.

Fig. 3 is an end elevational view of the chain and tenter clip shown in Fig. 2.

In the illustrated embodiment characterizing this invention there is shown a pair of webs or sheets of crinkled paper 1 and 2 which are fed from the supply rolls 3 and 4, respectively. The web 1 is led through a pair of rolls 5 and 6, the roll 6 being a coating roll partially submerged in an adhesive bath 7, in the present instance, heated asphalt contained in the tank 8, and then through a pair of squeeze or compression rolls 9. The adhesive applied to the under surface of web 1 is for a purpose directly more fully appearing. The web 2 is fed similar to web 1 through a similar pair of rolls 5 and 6, the latter partially submerged in the heated bituminous bath 7 in tank 8 and adapted to coat the surface of said web 2 facing the coated surface of web 1 as said web is passed through the compression rolls 9, as will be well understood.

In order to maintain a longitudinal tension on the webs 1 and 2 a brake mechanism 10 of conventional construction is suitably mounted on each of the rolls 3 and 4, said brake mechanism having a hand wheel 11 for controlling the tension as desired.

It was desired to construct a strong, flexible, waterproof, tough, and abrasive resistant material for bags and the like and to produce a light weight material possessing the above qualities and overcoming the deficiencies of the materials heretofore mentioned, and which was accomplished by inserting between the crinkled paper sheets and embedding in the hot asphalt, the loosely woven cotton membrane 12 now to be described.

The loosely woven fabric membrane or web 12 is led from roll 13 under guide roll 14, over guide roll 15, under guide roll 16, and through compression rolls 9 between the webs 1 and 2 as will directly more fully appear. It is very important that the web 12 be tensioned or stretched both longitudinally and laterally and in such condition compressingly embedded in the adhesive coating applied to the sheets or webs 1 and 2, and thereby adhesively and fusingly retained in such stretched condition in the single composite sheet A passing from rolls 9. Therefore, in order to effect a continuous longitudinal stretch of web 12, roll 13 is equipped with an adjustable brake mechanism 10 similar to rolls 3 and 4. In order to effect a continuous lateral tension or stretch of web 12, an endless chain tenter mechanism B is mounted adjacent the opposite edges of the horizontal stretch of the web between guide rolls 15 and 16. This mechanism B is of conventional design and forms no part of the instant invention, and while any well known type of device may be used, the endless chain device comprising the alternate clips 17 and link structures 18 has been found satisfactory. The alternate tenter clips 17 and link structures 18 are suitably hinged or pivoted together to form the endless chain. Each of the clips 17 has a body 19 formed with a horizontal web supporting portion 20 having a face plate 21. Arms 22 project over and are spaced above plate 21. Gate 23 is positioned between the arms and pivoted thereto on pin 24. A clamp plate element 25 is positioned to engage and bear on the selvage of the woven web 12 supported on the plate 21 to grip said web, as will be well understood. A controller 26 is associated with the gate member 23 and is adapted to engage the selvage edge of the web to aid the operation of the gate. Gate operating arm 27 extends upwardly therefrom and is adapted to be engaged by a suitable cam means to cause the gate to grip the edge of the web when the chain brings the clip into web engaging position at a point substantially adjacent roller 15, and is adapted to engage a disconnecting cam or trip means when it has moved to a point adjacent roll 16. Said body portion 19 is formed with vertically spaced flanges 28 and 29 between which extend and are suitably connected thereto the upper and lower plates 30 and 31 of links 18 and to effect the mounting therebetween of a roll 32.

Although the operation of the tenter chains would seem to be clear from the above description it might be well to further state that as each chain travels around the sprocket wheels 33 on which they are mounted the teeth of the sprocket pass between the rolls 32, and as the tenter chains are mounted at a slight angle with respect to the web, the web attains the desired maximum stretch as it passes under roll 16, and which roll is of greater length than the rolls 14 and 15, as will be clear without further discussion.

From the above it will be apparent that the pull on the web 12 by the rolls 9 will maintain its longitudinal and lateral stretched condition and following their compressing action it will be adhesively maintained in such condition in the composite sheet.

In this connection it will be noted that the cotton fabric is a strong, open weave which permits the asphalt or other adhesive to flow between and around the yarns, and permits adhesion of the two crinkled sheets of paper to each other between the interstices of the cotton fabric, as well as to the cotton fiber, and since the yarns in the cotton membrane are pulled tight in both directions as the membrane is inserted between the two crinkled sheets of paper and embedded in the heated asphalt, a smooth, even reinforcing material is provided and the resultant fused material is a flexible sheet having an extremely high bursting point and a higher strength than the total of the three component parts. Such material is particularly applicable for bag purposes since it is relatively inexpensive, light in weight, flexible, waterproof, and sift proof.

From the above it is apparent that I have provided an unusually lightweight, flexible, tough, waterproof, and abrasive resistant material especially adaptable for bag purposes, comprising specially selected paper for the outer layers adapted to withstand abrasion and water and crinkled or creped and treated to permit stretch in all directions without rupture, and, in the present instance, an asphalt or bituminous adhesive with satisfactory flexibility over a wide range. It is the stretching of the membrane in both directions and its adhesive retention in such condition that effects when thus combined with the crinkled fluted paper layers, a superior composite material for the purposes intended. Such composite material is devoid of irregular weak and strong spots and permits flexing without distortion and without a weakening effect, which is not true when the fibers are laid in the asphalt for reinforcement purposes. Thus the material forming the subject matter of this invention is relatively inexpensive to produce, light in weight, flexible, waterproof, sift proof, adapted to withstand sewing, and efficient for the purposes intended.

Although in practice it has been found that the form of the invention illustrated in the accompanying drawings and referred to in the above description as the preferred embodiment is the most efficient and practical, yet realizing the conditions concurrent with the adoption of the invention will necessarily vary, it is desired to emphasize that various minor changes in details of construction, proportion, and arrangement of parts, may be resorted to within the scope of the appended claims without departing from or sacrificing any of the principles of this invention.

Having thus described the invention, what is desired protected by Letters Patent is as set forth in the following claims.

I claim:

1. A method for producing a waterproof laminated material for making bags and the like consiting in longitudinally and laterally stretching a loosely woven fabric membrane and inserting said membrane in prestretched condition between longitudinally stretched crinkled paper sheets and adhesively uniting the sheets to the membrane and directly to each other through the open mesh of the membrane to effect a composite sheet, said composite sheet being of a strength greater than that of the added strength of the component sheets and membrane.

2. A method of producing a waterproof laminated material for making bags and the like consisting in coating the meeting surfaces of two crinkled paper sheets with an adhesive, stretching a loosely woven fabric membrane longitudinally, laterally and inserting said membrane in prestretched condition between said coated surfaces, and subjecting said laminated assembly to a compressing operation to adhesively unite the sheets to each other through the open mesh and to the membrane to maintain the latter in stretched condition and to form a single unitary sheet of greater strength than that of the added strength of the component sheets and membrane.

EDWARD H. COLESWORTHY.

REFERENCES CITED

The following references are of record in the file of this patent:

UNITED STATES PATENTS

| Number | Name | Date |
|---|---|---|
| 1,460,949 | Currier | July 3, 1923 |
| 1,877,270 | Collings | Sept. 13, 1932 |
| 1,753,281 | Barstow et al. | Apr. 8, 1930 |
| 1,991,168 | Marble | Feb. 12, 1935 |
| 2,085,473 | Rowe | June 29, 1937 |
| 600,676 | Menzie | Mar. 15, 1898 |
| 2,021,095 | Ball | Nov. 12, 1935 |
| 1,301,605 | Ringel | Apr. 22, 1919 |

FOREIGN PATENTS

| Number | Country | Date |
|---|---|---|
| 322,755 | France | Oct. 15, 1902 |